United States Patent Office 2,994,296
Patented Aug. 1, 1961

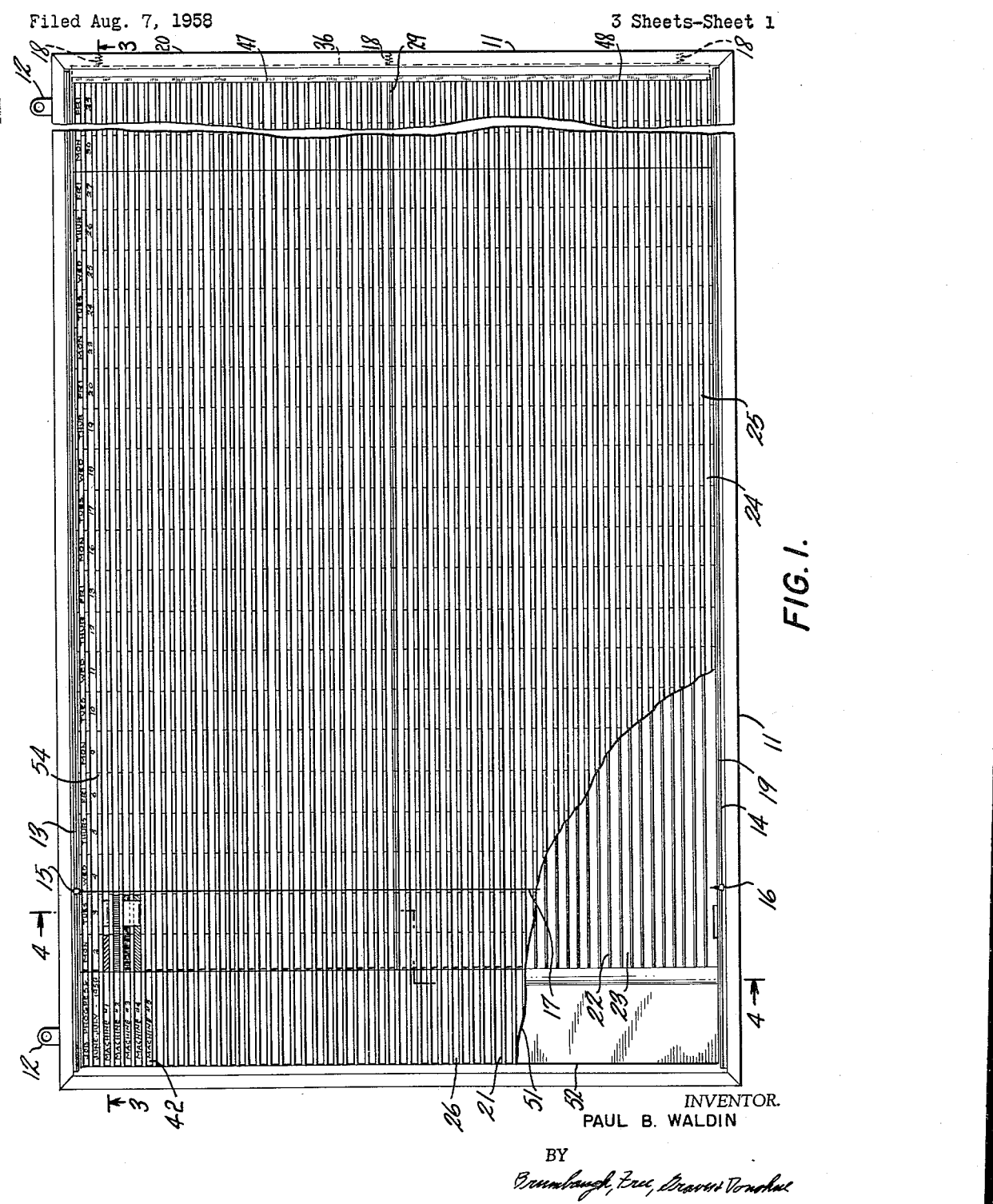

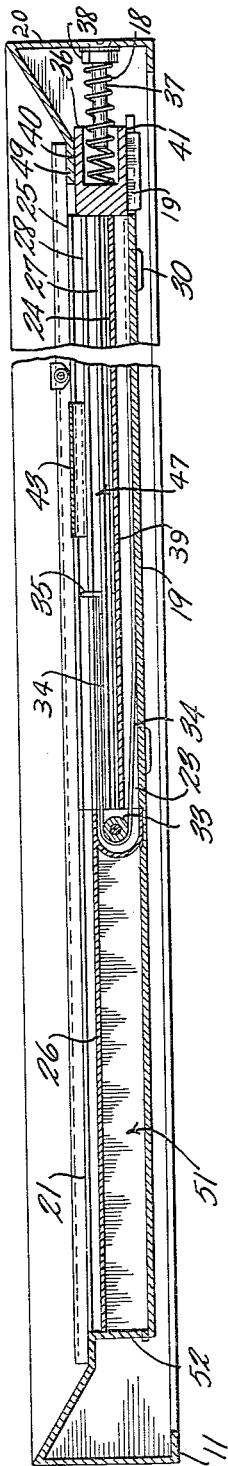

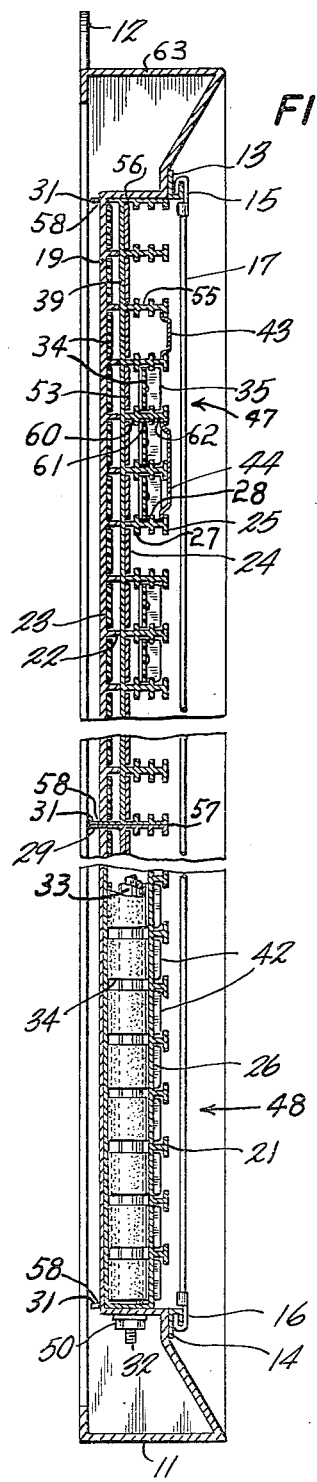
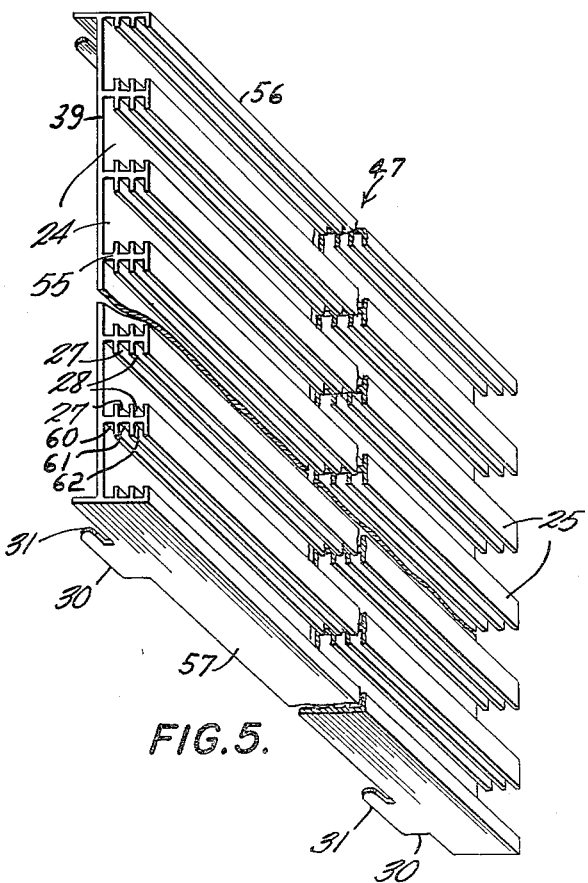

2,994,296
INDICATOR BOARD
Paul B. Waldin, Oakland, Calif., assignor to Wassell Organization, Inc., Westport, Conn., a corporation of Delaware
Filed Aug. 7, 1958, Ser. No. 753,706
3 Claims. (Cl. 116—135)

This invention relates to an indicator board and more particularly to a board which will accommodate the insertion of various data in order to provide a visual representation of the data posted thereon.

Visual indicator boards are generally used wherever it is desirable to display a number of interrelated facts, usually concerning a business process, in a convenient and orderly fashion. The facts are posted on the board in a manner such that each may be compared and checked against the others. Since indicator boards provide a convenient means of conveying information, they have found wide use as a control instrument in such fields as program or promotion scheduling, machine load scheduling, dispatching of planes or vehicles, manpower location and assignments and time charting and scheduling of any character.

The use of indicator boards had been limited in the past by the relatively small amount of information that could be contained on a board of convenient size. Prior to applicant's invention, to obtain a board which would contain the desired amount of information it had been necessary to increase the size of the board or resort to complicated manufacturing techniques which only produced a board which was difficult to operate. The above-mentioned deficiencies have been eliminated by applicant's invention.

It is therefore an object of this invention to provide a new and improved visual indicator board.

It is another object of this invention to provide a visual indicator board which is easily understood, simply operated and which will display a large amount of information in a relatively small space.

It is a further object of this invention to provide a visual indicator board which is particularly easy to manufacture and construct.

It is an additional object of this invention to provide a visual indicator board on which various data can be displayed simultaneously and be superposed one on another.

In its preferred embodiment this invention comprises a number of channel banks fixed in a frame, with each channel bank comprising a plurality of channels defined by parallel, spaced, horizontal guide walls. Each guide wall has on opposite sides three (3) parallel, spaced rails forming three (3) spaced, elongated slots into which data are inserted. In the bottom slot is usually inserted a semi-permanent indicator card generally showing a schedule of events. In the second slot is usually inserted a flexible tape which may be moved along the slot in the direction of the channel to indicate the passage of time or production progress. Paper inserts usually containing special notices or signals may be placed in the third or top slot and are easily removable and will slide along the slot over the top of the movable tape and indicator card. By placing information in each of the three slots, each channel will display three complementary bits of information so that the capacity and effectiveness of the indicator board is increased.

This invention may be better understood from the following detailed description taken in conjunction with the accompanying drawings in which:

FIG. 1 is a plan view showing the indicator board with the lower left portion cut away to show the back channel guides.

FIG. 2 shows an enlarged portion of the upper left corner of the indicator board of FIGURE 1 setting forth in greater detail the manner in which various data are posted on the board.

FIG. 3 is an enlarged cross sectional view taken along the line 3—3 of FIG. 1.

FIG. 4 is an enlarged cross sectional view taken along line 4—4 of FIG. 1.

FIG. 5 shows in perspective a channel bank illustrated in section 4 in FIGURE 4 made in accordance with a preferred embodiment of the invention.

Referring to FIGURE 1, there is illustrated a rectangular frame 11 into which two (2) upper and lower rectangular channel banks 47 and 48 respectively are inserted, the triple horizontal line 29 representing the line of separation between the channel banks. At the top of the board are two extensions 12 containing eyelets to be used in hanging the indicator board on a wall. Along the top and bottom of the indicator board are fastened two rails 13 and 14, better illustrated in FIGURE 4, supporting hooks 15 and 16 respectively. The hooks, as illustrated in FIGURE 4, hold a datum wire 17 vertically across the face of the indicator board, and are slidable horizontally along the rails so that the datum wire may be moved to a particular point in time or progress shown by data retained on the board beneath the wire. The datum wire is held so that it will clear any data (for instance tabs, paper inserts, signals, or like data, described below) retained on the board.

Referring again to FIGURE 1, a third rectangular section 51 is mounted in the area between the channel banks 47 and 48 and the vertical left edge 52 of the frame 11, the section 51 being adapted to hold nameplates 42 describing the machinery or items being scheduled. The nameplates may read, for instance, "Machine No. 1," "Machine No. 2," and the like.

The section 51 is illustrated in greater detail in FIGURE 2, and in section in FIGURE 4 and is comprised of outwardly extending, horizontal, parallel, spaced guide walls 21 (note in particular FIGURE 4) defining parallel horizontal channels 26, into which the nameplates 42 are inserted. This portion of the indicator board is relatively conventional.

An example of a preferred channel bank for the indicator board is illustrated in FIGURE 5, and designated by the numeral 47, the upper channel bank of FIGURE 1. Essentially, the channel bank 47 comprises a rectangular shaped, flat supporting plate 39 having integral therewith outwardly extended, elongated, spaced, parallel guide walls 55 and upper and lower, outwardly extending side walls 56 and 57 parallel to the guide walls 55. On the opposite side of the plate 39, extending inwardly, at least four (4) extensions 30 are provided forming hooks 31, the purpose of which will be described.

The side walls 56 and 57 and the guide walls 55 define parallel, spaced, elongated channels 24. The guide walls 55 are provided, on opposite sides, with multiple members [in this instance, three (3)] of oppositely directed parallel spaced guide rails 25, 27 and 28, extending into the channels 24, and forming with the plate 39 elongated spaced slots, 60, 61 and 62. The side walls 56 and 57 are provided with complementary guide rails extending into the channels forming similar slots.

Thus, in effect, the channel 24 for the purposes of this application, shall be defined as being comprised of a multiple number of superimposed channels, in this instance, three (3), defined by the opposing slots 60, 61 and 62 formed by the plate 39 and opposing guide rails 27, 28 and 25 extending into the channel 24. The bottommost channel formed by slots 60, in most applications of the invention, shall receive a stiff paper insert, designated in FIGURES 2 and 4 as item 53. Note in FIGURE 4, the channel bank 47 comprising the supporting panel 39, the outwardly extending, spaced, parallel guide walls 55 and side walls 56 and 57 forming channels 24, and guide rails 25, 27 and 28 forming slots 60, 61 and 62. The center channel formed by slots 61 between the rails 27 and 28 receives a flexible tape 34 (FIGURES 2 and 4) and is sufficiently wide to permit the tape to be moved along the channel by an outwardly extending tab 35 (also shown in FIGURE 3) attached to an end of the tape. The outer channel formed by slots 62 between the rails 25 and 28 receives paper inserts, designated as items 43 or 44, shown in FIGURES 2, 3, and 4, which act as signals or special notices. Insert 43 spans one channel while insert 44 spans two channels.

The manner in which a channel bank is held in the frame is illustrated in FIGURES 1, 3 and 4. Along the right side 20 of the frame 11 (FIGURES 1 and 3) an elongated vertically oriented plunger 36 is positioned parallel to the right side 20 of the frame and between the channel banks 47 and 48 and the side 20 of the frame. As illustrated in FIGURE 3, the plunger is slidably engaged on outer and inner surfaces 40 and 41 between a flange portion 49 of the frame and a rear panel 19 of the frame, respectively. FIGURE 4 shows the construction of the frame 11 somewhat more clearly, and essentially, the frame comprises merely a rectangular shaped rear panel 19, and outwardly extending sides 63, including sides 20 and 52, FIGURE 1, encompassing the panel 19 and being arranged to aid in retaining the channel banks, section 51 and the datum wire. Additionally, the sides 63 are shaped, as shown in FIGURE 4, to hold extensions 12 for hanging the board, and to hold the rear panel 19 away from the wall on which the indicator board is hung. Referring to FIGURE 3, plungers 36 are held against a channel bank 47, by the force of three (3) compression springs 18. The springs are also illustrated in FIGURE 1, and are held in place by bolts 37 (FIGURE 3), which in turn are fastened to the frame by washers and nuts 38. The force of the compression springs 18 between the right side 20 of the frame 11 and the plunger 36 holds the channel banks 47 and 48 securely in place in the frame. As shown in FIGURES 1 and 3, the banks are held firmly against the section 51 of the frame.

Regularly spaced slots or holes (not shown) are provided in the rear panel 19, in the areas 58, FIGURE 4, into which the extensions 30 and hooks 31 of the channel banks 47 and 48 are inserted. The force of the compression springs forces the banks to slide so that the rear panel 19 of the frame is received by the undercut portions of the hooks 31, the hooks 31 and compression springs thereby cooperating to hold the channel banks in position. FIGURE 4 illustrates the relationship of the channel banks 47 and 48 to the frame 11 and rear panel 19, and illustrates, in areas 58, the hooks 31 protruding through the rear panel.

As illustrated in FIGURE 1, and better illustrated in FIGURE 4, the rear panel 19 is provided with outwardly extending, horizontal, spaced and parallel ridges 22 on the front surface thereof forming grooves 23.

The supporting plate 39 of the channel banks 47 and 48 rests on the free upper edges of the ridges 22, as shown in FIGURE 4, and is positioned so that the ridges 22 of the rear panel 19 of the frame 11 coincide with the guide walls 55 of the channel banks 47 and 48. In this way, the grooves 23 of the rear panel 19 and the intermediate channels formed by slots 61 of the channel banks 47 and 48 are adapted to retain the flexible tapes 34, the grooves 23 acting as reservoirs for unexposed portions of the tapes 34. Portions of the tapes are thus positioned above or outwardly of the channel bank plate 39 and other portions are positioned below the channel bank plates. The flexible tape as illustrated in FIGURES 2, 3 and 4 is looped over a roller 33 which is held in the frame in the area 51 adjacent the left hand side of the channel banks 47 and 48. The roller 33 is firmly held in the frame against rotation by a bolt 32 and nut 50 (FIGURE 4).

As illustrated in FIGURES 1 and 2, the channels 26 in section 51 of the indicator board, defined by guide walls 21, are positioned and arranged to coincide in width and alignment with the channels 24, defined by outwardly extending guide walls 55 of the channel banks 47 and 48.

An illustration of one application of this invention to job progress and production control in a machine shop is shown in FIG. 2. Each machine, such as machine No. 1, No. 2, etc. is assigned one horizontal channel. The vertical lines 54 divide the channel banks into vertical columns representing time periods. In the illustration each column denotes the schedule of operation for the day designated at the top of the column in channels 45 and 46. The cards 53 are inserted into the bottom of the channel for each machine showing the job number and operation scheduled for each machine for that date. As each job is completed the tape 34 is moved left to right by the tab 35 covering the cards 53 to show that particular operation has been completed. Since the datum line 17 is set for the current operating date, the tape for that machine should be advanced up to the datum line if production is on schedule. If a machine, such as machine No. 1 in the illustration, is behind for any reason, that fact immediately is noticeable because the tape has not been advanced to the datum line. In such a case a special notice insert, such as 43, showing that the machine is out for repairs, is inserted in the third rail. Other special notice inserts such as 44 can be inserted over 2 or more channels to show any other pertinent fact regarding the operation of the machines.

The paper inserts 53 of this illustration are semi-permanent in position, usually not being moved until the time period covered by the entire board has been completed. The tapes are readily adjustable horizontally by the use of the tabs 35, and the special notice inserts 43 and 44 are designed to be easily snapped into place in the channels and to be moved horizontally through the channel over the top of the tab on the tape. The notices may be inserted into the channel by fixing one edge of the card into the rail, bending the middle of the card outward and fixing the other edge of the card into the rail on the other side of the channel. The tapes are preferably made of a colored material to contrast with the background and show the progress of the machine more clearly. The special notice inserts are usually made of paper but they can be made of a transparent material to show the job number and operation beneath it.

The channel banks and frame are preferably manufactured from a material such as plastic or a light metal such as aluminum. Preferably the channel banks are manufactured by an extrusion process using aluminum. The channel banks can be extruded in one piece or the channels can be made separately so that their position in the indicator board would be adjustable. The preferred method, however, is to extrude the channel banks of aluminum in one piece.

Particular embodiments of the invention have been shown and described. It is apparent that changes and modifications may be made without departing from this invention in its broader aspects. Therefore the aim in the appended claims is to cover all such changes and modifications as fall within the true spirit of this invention.

I claim:

1. An indicator board comprising a frame having a display area, a plurality of channel banks mounted in the display area in said frame, each said channel bank comprising a supporting plate having a flat, front surface thereon, a series of parallel, spaced, guide walls integral with said plate, longitudinally disposed on said front surface of said plate and defining a plurality of parallel channels visible in the display area, each said guide wall comprising a front edge, opposite sides, and multiple overlying spaced and parallel guide rails longitudinally disposed on and extending outwardly from said opposite sides and into said channels and forming multiple overlying longitudinally disposed spaced slots, the rails of adjacent guide walls, which are disposed in one of said channels, being equal in number and equally spaced from said plate to form cooperating channels to receive overlying data, said indicator board further comprising means releasably retaining each said channel bank within said frame.

2. An indicator board comprising a frame having a display area, a plurality of channel banks mounted in the display area in said frame, each said channel bank comprising a supporting plate having a flat, front surface thereon, a series of parallel spaced guide walls integral with said plate longitudinally disposed on said front surface of said plate and defining a plurality of parallel channels visible in the display area, each said guide wall comprising a front edge, opposite sides, and at least three spaced, parallel guide rails longitudinally disposed on and extending outwardly from said opposite sides and into said channels and forming at least three overlying spaced longitudinally disposed slots on the sides of said guide rails, data means comprising first insert card means retained in the bottommost slots of adjacent guide walls, adjustable flexible tape means retained in slots of adjacent guide walls overlying said bottommost slots, and second insert card means retained by a third pair of slots of adjacent guide walls overlying said slots for said flexible tape means, all of said data means being simultaneously viewable, said indicator board further comprising means releasably retaining each said channel bank within said frame.

3. An indicator board according to claim 2, further including roller means about which said adjustable tape is trained, said frame comprising a plurality of parallel longitudinally disposed ridges underlying said guide walls and forming channels underlying said channels of said channel banks, said channels of said frame being arranged thereby to receive portions of said flexible tape not exposed in said display areas.

References Cited in the file of this patent

UNITED STATES PATENTS

| | | |
|---|---|---|
| 2,118,675 | Jackson | May 24, 1938 |
| 2,299,284 | Steidemann | Oct. 20, 1942 |
| 2,584,511 | Stockfleth | Feb. 5, 1952 |
| 2,602,450 | Johansen | July 8, 1952 |
| 2,649,790 | Johnson | Aug. 25, 1953 |
| 2,780,202 | Sanderson | Feb. 5, 1957 |